Jan. 7, 1936.  A. WOLLENSAK  2,026,724
LENS MOUNT
Filed Jan. 14, 1935  2 Sheets-Sheet 1

INVENTOR
Andrew Wollensak
BY
Harold E. Stonebraker
ATTORNEY

Jan. 7, 1936.  A. WOLLENSAK  2,026,724
LENS MOUNT
Filed Jan. 14, 1935  2 Sheets-Sheet 2

INVENTOR
Andrew Wollensak
Harold E. Stonebraker
ATTORNEY

Patented Jan. 7, 1936

2,026,724

UNITED STATES PATENT OFFICE 2,026,724

LENS MOUNT

Andrew Wollensak, Rochester, N. Y., assignor to Wollensak Optical Company, Rochester, N. Y., a corporation of New York Application January 14, 1935, Serial No. 1,601

8 Claims. (Cl. 88—57)

My invention relates to a lens mount, and has to do more particularly with the type of construction intended for use in motion picture cameras.

The invention has for one of its objects to afford a practical and efficient structure that overcomes an objection inherent in prior lens mounts for the purpose by the provision of means that affords a fine adjustment of the lens system while preventing lost motion between the parts so that it is possible to obtain a very slight focusing adjustment readily and to a more accurate degree than heretofore.

Another purpose of the invention is to afford a simple construction that permits of readily adjusting the lens mount rotatively with reference to the camera body after it is attached thereto, so as to make possible positioning the reading scales of the lens mount in uppermost position where they can be readily observed by the operator.

To these and other ends, the invention consists in the construction and arrangement of parts that will appear clearly from the following description when read in conjunction with the accompanying drawings, the novel features being pointed out in the claims following the specification.

Figure 1:
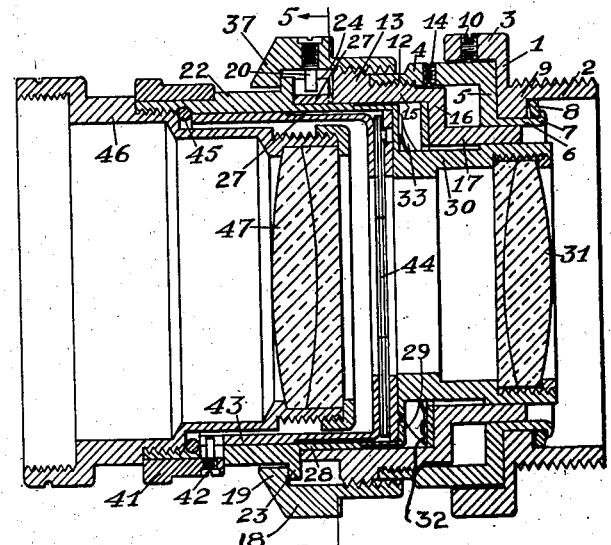
Fig. 1 is a longitudinal vertical sectional view taken centrally of a lens mount constructed in accordance with a preferred embodiment of the invention, and showing the lens barrel and lens system adjusted to its innermost position.

Referring more particularly to the drawings, in which like reference characters refer to the same parts throughout the several views, the mechanism shown is intended for attachment to a wall or body of a motion picture camera, and to this end includes a cylindrical attaching member designated at 1, having an exteriorly threaded neck 2, that engages a correspondingly threaded opening in the wall or body of the camera, not shown.

The attaching member 1 also includes a cylindrical collar 3 that engages the outer surface of a cylindrical sleeve 4, the latter constituting a part of the supporting means for the lens system and having a vertical wall 5 that abuts the adjacent vertical wall of the attaching member 1, and has at its inner end a cylindrical collar 6 terminating in an outwardly directed flange 7 preferably formed by spinning over the inner end of said collar 6.

The flange 7 engages the inner surface of a spring 8 interposed between said flange and an inwardly projecting shoulder 9 on the attaching member 1. Said spring 8 has one or more portions bent out of the plane which it occupies so as to exert a yieldable pressure against the shoulder 9 and flange 7 respectively and hold said parts in tight frictional engagement, while permitting their relative turning when sufficient force is applied. By this means, after the attaching member is tightly secured to the camera body, if the reading scales on the lens mount are not in proper position to be observed by the operator, the supporting element 4, which carries the lens barrel, can be turned against the friction of the spring 8 until the reading scales are in the desired relation. If it is desired to hold the lens mount rigidly in such position, an adjusting screw 10 is provided in a threaded opening in the collar 3 and engageable with the outer surface of the supporting element 4.

The supporting member 4 just described has an interiorly threaded outer portion 12 which engages an exteriorly threaded portion on the support designated generally at 13 while 14 is an adjusting screw for holding these two parts of the supporting means rigidly in assembled relationship. The support 13 includes a longitudinally extending cylindrical portion 15 terminating in a vertical wall or shoulder 16 from which extends a longitudinal tubular guiding portion 17 that receives a portion of the lens barrel to be described presently, and is in turn guided in the collar 6. The support 13 is also exteriorly threaded on its outermost surface to receive the rotatable adjusting member or ring 18, which has an inwardly extending flange or shoulder portion 19 and carries a depending stop pin 20 threaded therein for purposes that will appear presently.

Figure 2:
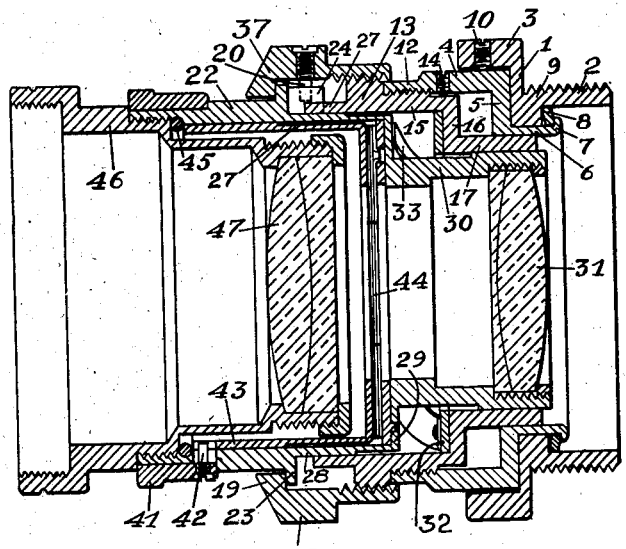
Fig. 2 is a similar view showing the lens barrel and lens system adjusted to its outermost position.
Figure 6:
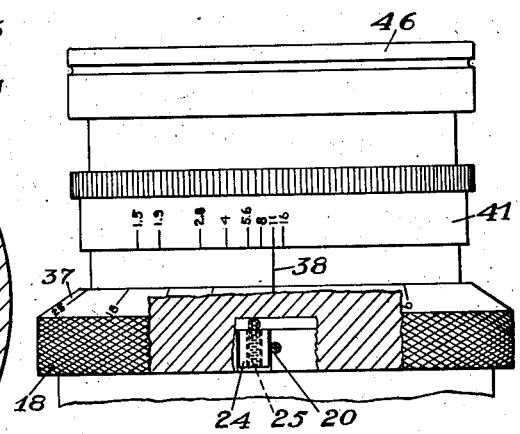
Fig. 6 is a plan view, partially broken away on the section 6—6 of Fig. 5.
Figure 7:
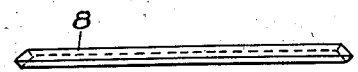
Fig. 7 is a detail side view of the spring employed for maintaining frictional engagement between the camera attaching member and the supporting means for the lens barrel.

Adjustable endwise of the supporting means is the lens barrel 22 which carries the system of lenses, and is provided with an outwardly directed flange 23 that abuts the flange 19 on the adjusting ring. Thus by turning the adjusting ring in one direction, the flange 19 engages flange 23 and forces the lens barrel inwardly while movement of the lens barrel in the opposite direction is effected in a manner that will later be described. The flange 23 on the lens barrel carries an abutment or lug 24, preferably attached thereto by a screw 25, see Fig. 6, and said lug is movable endwise in a slot formed in the collar 27 of the support, so as to prevent turning of the lens barrel with relation to the support while permitting the desired endwise adjustment. Said lug 24 also serves to limit turning of the adjusting ring 18 which can only be rotated as far as the stop pin 20 will permit by engagement with opposite sides of the lug 24, as shown in Figs. 1 and 2 respectively.

Figure 3:
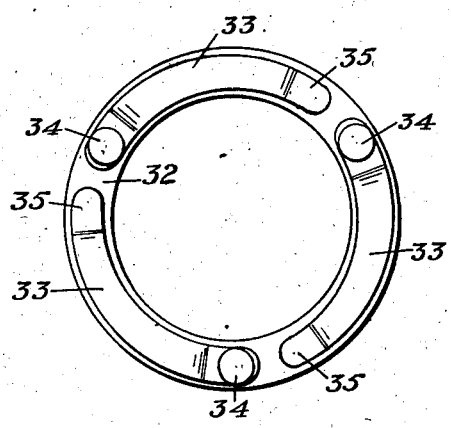
Fig. 3 is a plan view of the spring means employed between the support and lens barrel for actuating the latter outwardly.
Figure 4:
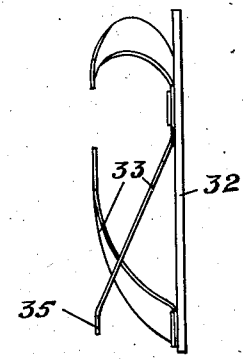
Fig. 4 is a side view of the same.
Figure 5:
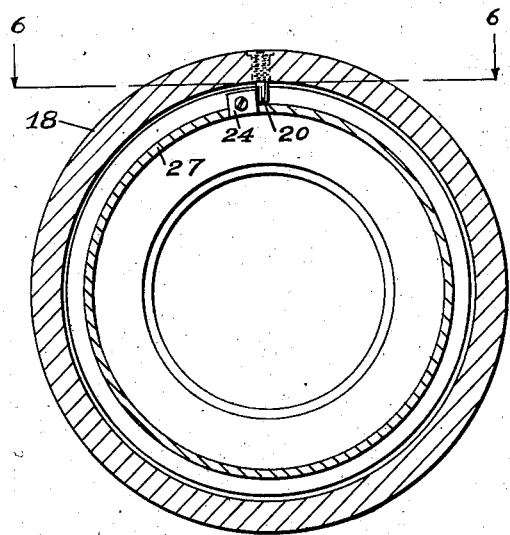
Fig. 5 is a transverse vertical sectional view on the line 5—5 of Fig. 1.

The lens barrel 22 includes a cylindrical longitudinal portion 28 which terminates in a vertical wall 29 while the latter is provided with a longitudinally extending cylindrical portion 30 that carries the lens 31 at its inner end and is guided in the aforementioned cylindrical portion 17 of the support. The lens barrel is actuated outwardly or away from the support by spring means preferably located between the vertical wall 29 of the lens barrel and the vertical wall 16 of the support. This spring means is preferably in the form illustrated in Figs. 3 and 4, comprising a flat ring 32 positionable against the wall 16 and having a series of spring elements 33, each of which is rigidly attached at one end to the ring 32 as shown at 34 and extends outwardly, affording a free end 35 which yieldably presses against the wall 29 of the lens barrel. As a result of this spring arrangement, when the adjusting ring is turned to move flange 19 away from flange 23, the free ends 35 of the springs 33 actuate the lens barrel uniformly and hold the flange 23 tightly in contact with flange 19 so that outward movement of the lens barrel closely follows corresponding movement of the adjusting ring and no lost motion between these parts is permitted. Thus any movement of the adjusting ring in either direction insures a corresponding accurate and fine adjustment of the lens barrel.

The adjusting ring has a bevelled surface 37 provided with markings thereon which cooperate with a stationary indication 38 on the outer surface of the lens barrel, and said indication also cooperates with markings on the outer surface of an adjusting ring 41 which is rotatively arranged on the lens barrel and controls the usual iris diaphragm. To this end, the ring 41 carries a pin 42 that engages a rotatable sleeve 43 which at its inner end carries the iris diaphragm 44, to be operated when turned as usual in this type of construction. The sleeve 43 is held in place in the lens barrel by a spring ring 45 that is seated in a groove for this purpose, and 46 designates a cylindrical element forming a part of the lens barrel to which it is threadedly connected and carrying the lens 47.

While the invention has been described with reference to a particular structural embodiment, the improvements are not confined to the details herein shown and described, and the invention is susceptible of various modifications or changes which this application is intended to cover and which may come within the purposes of the invention or the scope of the following claims.

I claim:

1. In a lens mount, the combination with cylindrical supporting means and a lens barrel telescoping within and adjustable endwise of the supporting means, an adjusting member threaded on the supporting means, the adjusting member and lens barrel having cooperating flanges whereby the adjusting member acts when turned to move the lens barrel in one direction only, and yieldable instrumentalities located between the lens barrel and supporting means and acting to move the lens barrel in the opposite direction and to hold said flanges in contact.

2. In a lens mount, the combination with cylindrical supporting means and a lens barrel telescoping within and adjustable endwise of the supporting means, an adjusting member threaded on the supporting means, a non-threaded connection between the adjusting member and lens barrel comprising an inwardly extending flange on the adjusting member engaging an outwardly extending flange on the lens barrel whereby the adjusting member is operable to move the lens barrel in one direction only, and spring means located between the supporting means and lens barrel and operating to move the lens barrel in the opposite direction and to hold said flanges in contact.

3. In a lens mount, the combination with a support having a vertical wall and a lens barrel adjustable endwise of the support, yieldable instrumentalities located between said vertical wall and the lens barrel comprising a ring and a series of spring elements each having one end fixedly attached to said ring and extending thence away from the ring affording a series of free ends which yieldably press against the lens barrel, and an adjusting ring threaded on said support and having a flange engageable with a cooperating flange on the lens barrel for actuating the latter in one direction, said spring elements serving to actuate the lens barrel in the opposite direction against the action of the adjusting ring.

4. In a lens mount, the combination with a support having a vertical wall and a lens barrel adjustable endwise of the support, yieldable instrumentalities located between said vertical wall and the lens barrel comprising a ring and a series of spring elements each having one end fixedly attached to said ring and extending thence away from the ring affording a series of free ends which yieldably press against said lens barrel, an adjusting ring threaded on said support and having a flange engageable with a cooperating flange on the lens barrel for actuating the latter in one direction, said spring elements serving to actuate the lens barrel in the opposite direction, and cooperating stops on the lens barrel and adjusting ring for limiting turning movement of the latter in opposite directions.

5. In a lens mount, the combination with a support having a vertical wall and a lens barrel adjustable endwise of the support, of spring means located between said vertical wall on the support and the lens barrel for actuating the latter in one direction, an adjusting ring threaded on the support and rotatable thereon, the support having a longitudinally extending slot, an abutment carried by the lens barrel and movable endwise of said slot to prevent turning of the lens barrel with relation to the support, the adjusting ring and lens barrel having cooperating engaging flanges whereby turning of the adjusting ring actuates the lens barrel in a direction opposite to the action of said spring means, and a stop carried by the adjusting ring and engageable with opposite sides of the aforesaid abutment to limit turning of the adjusting ring in opposite directions.

6. In a lens mount, the combination with a cylindrical support and a lens barrel telescoping within and adjustable endwise of the support, of an adjusting ring rotatable on the support and a non-threaded connection between the adjusting ring and lens barrel whereby turning of the adjusting ring moves the lens barrel in one direction only, the lens barrel being movable away from the adjusting ring, and spring means tending to actuate the lens barrel toward the adjusting ring and to hold it in contact therewith.

7. In a lens mount, the combination with a cylindrical attaching member having a threaded portion adapted to be secured to the wall of a camera body or the like and provided with an inwardly extending shoulder, of supporting means for a lens barrel mounted on and rotatable with relation to said attaching member and including a collar having an outwardly projecting flange at its innermost end, and a spring element located between said flange and the aforementioned shoulder on the attaching member, said spring element acting to hold the attaching member and supporting means in frictional engagement and to permit relative adjustment of said parts.

8. In a lens mount, the combination with a support having a vertical wall and a lens barrel adjustable endwise of the support, of a plurality of spring elements located between said vertical wall on the support and the lens barrel and engaging the latter at a plurality of points for actuating the latter uniformly in one direction, an adjusting ring threaded on the support and rotatable thereon, means for limiting movement of said ring in opposite directions, and means for preventing turning of the lens barrel with relation to the support, the adjusting ring and lens barrel having cooperating engaging flanges whereby turning of the adjusting ring actuates the lens barrel in a direction opposite to the action of said spring means.

ANDREW WOLLENSAK.